(12) United States Patent
Deng

(10) Patent No.: US 11,948,597 B2
(45) Date of Patent: Apr. 2, 2024

(54) AUDIO PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Shuo Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 250 days.

(21) Appl. No.: 17/527,935

(22) Filed: Nov. 16, 2021

(65) Prior Publication Data
US 2022/0076692 A1    Mar. 10, 2022

Related U.S. Application Data

(63) Continuation of application No. PCT/CN2020/116711, filed on Sep. 22, 2020.

(30) Foreign Application Priority Data

Dec. 11, 2019    (CN) .......................... 201911267593.7

(51) Int. Cl.
*G10L 25/51* (2013.01)
*G10L 25/24* (2013.01)
*G10L 25/27* (2013.01)

(52) U.S. Cl.
CPC .............. *G10L 25/51* (2013.01); *G10L 25/24* (2013.01); *G10L 25/27* (2013.01)

(58) Field of Classification Search
CPC ......... G10L 15/02; G10L 15/06; G10L 25/24; H04R 1/1041; H04R 1/1083
See application file for complete search history.

(56) References Cited

U.S. PATENT DOCUMENTS

2001/0046304 A1*  11/2001  Rast ..................... H04R 1/1083
                                                            381/26
2017/0156006 A1    6/2017   Dennis

FOREIGN PATENT DOCUMENTS

CN          1897054 A      1/2007
CN          101404160 A    4/2009
(Continued)

OTHER PUBLICATIONS

International Search Report and Written Opinion for PCT/CN2020/116711 dated Dec. 25, 2020 including translation of the International Search Report (14 pages).

(Continued)

*Primary Examiner* — Kile O Blair
(74) *Attorney, Agent, or Firm* — Crowell & Moring LLP

(57) ABSTRACT

The embodiments of this application disclose an audio processing method and apparatus, an electronic device, and a storage medium. In the embodiments of this application, a current playback environment of audio may be obtained; audio recognition may be performed on ambient sound of the current playback environment in a case that the current playback environment is in a foreground state; foreground sound in the ambient sound may be determined according to an audio recognition result; the foreground sound in the ambient sound may be classified to determine a type of the foreground sound; and audio mixing may be performed on the foreground sound and the audio to obtain mixed playback sound based on the type of the foreground sound.

17 Claims, 5 Drawing Sheets

(56) References Cited

FOREIGN PATENT DOCUMENTS

| | | | |
|---|---|---|---|
| CN | 103971680 | A | 8/2014 |
| CN | 205864671 | U | 1/2017 |
| CN | 107103901 | A | 8/2017 |
| CN | 107613113 | A | 1/2018 |
| CN | 108475502 | A | 8/2018 |
| CN | 108764304 | A | 11/2018 |
| CN | 110930987 | A | 3/2020 |
| EP | 3 324 406 | A1 | 5/2018 |
| JP | 2005295175 | A | 10/2005 |
| KR | 101647974 | B1 | 8/2016 |
| WO | WO 2007/007916 | A1 | 1/2007 |

OTHER PUBLICATIONS

Chinese Office Action for Chinese Patent Application 2019112675937 dated Aug. 27, 2020, including an English Concise Explanation (10 pages).

* cited by examiner

AUDIO PROCESSING METHOD AND APPARATUS, ELECTRONIC DEVICE, AND STORAGE MEDIUM

RELATED APPLICATION

This application is a continuation of International Patent Application No. PCT/CN2020/116711, filed Sep. 22, 2020, which claims priority to Chinese Patent Application No. 201911267593.7, filed with the China National Intellectual Property Administration on Dec. 11, 2019, and entitled "AUDIO PROCESSING METHOD AND APPARATUS AND STORAGE MEDIUM". The contents of International Patent Application No. PCT/CN2020/116711 and Chinese Patent Application No. 201911267593 are each incorporated by reference herein in their entirety.

FIELD OF THE TECHNOLOGY

This application relates to the field of communications technologies, and specifically, to an audio processing method and apparatus, an electronic device, and a storage medium.

BACKGROUND OF THE DISCLOSURE

As the 4G era develops and the 5G era arrives, watching video content on mobile devices has gradually become the main entertainment for many users.

SUMMARY

Embodiments of this application provide an audio processing method, executed by an electronic device, and including:
  obtaining a current playback environment of audio;
  performing audio recognition on ambient sound of the current playback environment in a case that the current playback environment is in a foreground state;
  determining foreground sound in the ambient sound according to an audio recognition result;
  classifying the foreground sound in the ambient sound to determine a type of the foreground sound; and
  performing audio mixing on the foreground sound and the audio to obtain mixed playback sound based on the type of the foreground sound.

Correspondingly, the embodiments of this application further provide an audio processing apparatus, including:
  an obtaining unit, configured to obtain a current playback environment of audio;
  a recognition unit, configured to perform audio recognition on ambient sound of the current playback environment in a case that the current playback environment is in a foreground state;
  a determining unit, configured to determine foreground sound in the ambient sound according to an audio recognition result;
  a classifying unit, configured to classify the foreground sound in the ambient sound to determine a type of the foreground sound; and
  an audio mixing unit, configured to perform audio mixing on the foreground sound and the audio to obtain mixed playback sound based on the type of the foreground sound.

Besides, the embodiments of this application further provide a computer-readable storage medium, storing a plurality of instructions, and the instructions being loaded by a processor, to perform the steps of any audio processing method provided in the embodiments of this application.

Besides, the embodiments of the present disclosure further provide an electronic device, including: a memory, a processor, and a computer program stored in the memory and executable on the processor, and the program, when executed by the processor, performing the steps of any audio processing method provided in the embodiments of the present disclosure.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

When watching content of a video on a mobile device, a user is easily attracted by the content of the video in some specific scenarios, for example, the user watches the video in a complex environment while wearing headphones. In this case, the user ignores ambient sound around, causing unpredictable dangers or inconvenience. For example, when walking, the user may not be able to notice the environment and sound around, and then ignore the dangerous environment around. When wanting to talk with others, the user needs to take off the headphones or lower the volume to clearly hear sound of an interlocutor, which interrupts viewing and deteriorates viewing experience.

In view of this, the embodiments of the present disclosure provide an audio processing method and apparatus, an electronic device, and a storage medium, which can improve flexibility of audio playback.

The embodiments of this application provide the audio processing method and apparatus and the storage medium. The audio processing apparatus may be integrated in the electronic device, and the electronic device may be a server or a device such as a terminal.

Figure 1A:
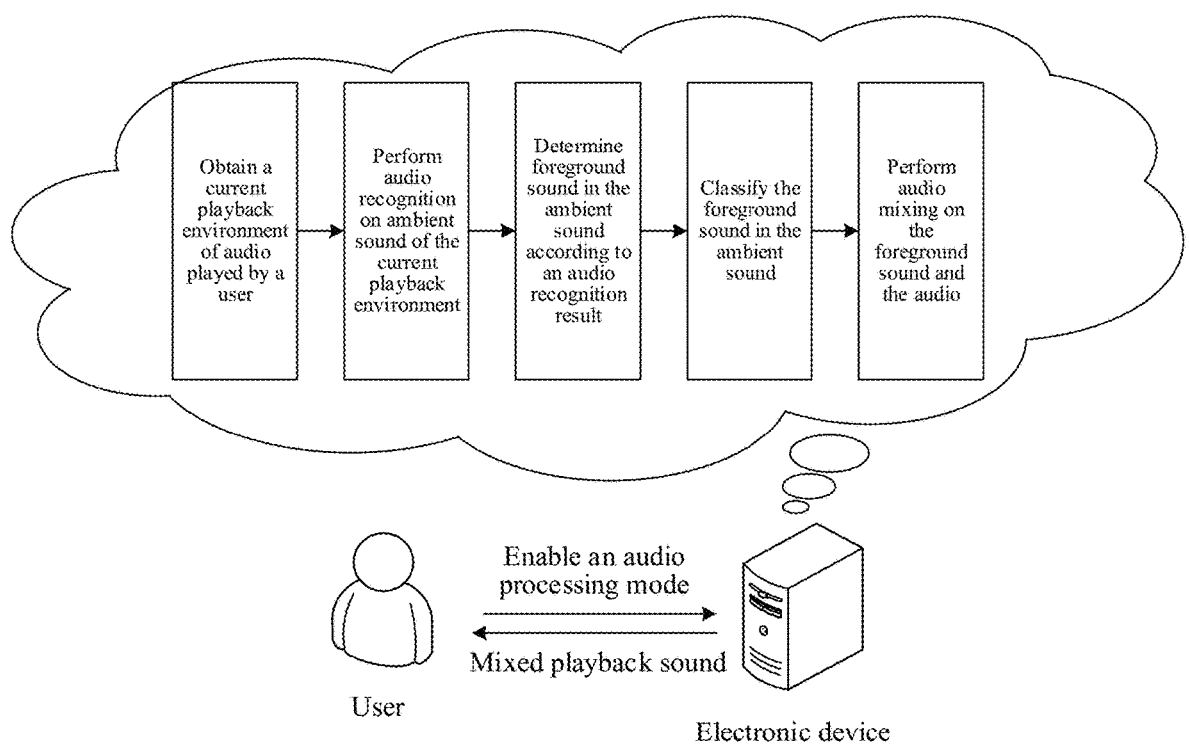
FIG. 1a is a schematic flowchart of a scenario of an audio processing method according to an embodiment of this application.

For example, referring to FIG. 1a, the electronic device integrated with the audio processing apparatus may first obtain a current playback environment of audio playback of a user when the user enables an audio processing mode; perform audio recognition on ambient sound of the current playback environment in a case that the current playback environment is in a foreground state; determine foreground sound in the ambient sound according to an audio recognition result; classify the foreground sound in the ambient sound to determine a type of the foreground sound; and perform audio mixing on the foreground sound and the audio to obtain mixed playback sound based on the type of the foreground sound.

In the solution, the ambient sound during audio playback may be obtained, a current playback state may be then inferred according to the ambient sound, and audio mixing may be performed according to the current playback state with reference to the currently played audio. Therefore, this can effectively improve flexibility of audio playback. Besides, the user can always pay attention to environment information around when playing the audio while wearing headphones, and obtain more secure and convenient listening experience.

The following provides descriptions in detail. A description order of the following embodiments is not construed as a limitation on a preferred order of the embodiments.

In the embodiments, descriptions are provided from the perspective of the audio processing apparatus. The audio processing apparatus may be specifically integrated in the electronic device. The electronic device may be a server or a device such as a terminal. The terminal may include a device such as a mobile phone, a tablet computer, a notebook computer, and a personal computer.

The audio processing method includes: obtaining a current playback environment of audio; performing audio recognition on ambient sound of the current playback environment in a case that the current playback environment is in a foreground state; determining foreground sound in the ambient sound according to an audio recognition result; classifying the foreground sound in the ambient sound to determine a type of the foreground sound; and performing audio mixing on the foreground sound and the audio to obtain mixed playback sound based on the type of the foreground sound.

Figure 1B:
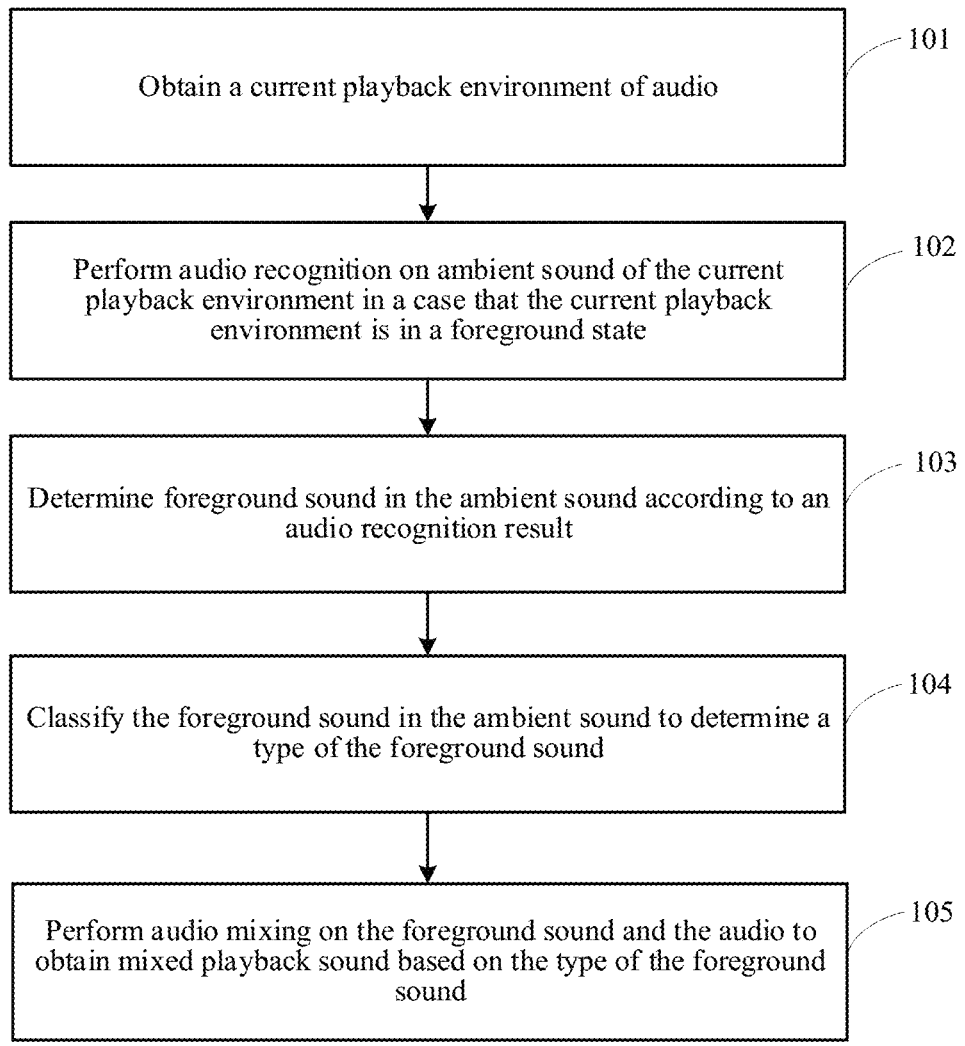
FIG. 1B is a first flowchart of an audio processing method according to an embodiment of this application.

As shown in FIG. 1B, the audio processing method may be specifically executed by an audio processing apparatus integrated in an electronic device. A specific process may include the following steps.

Step 101: Obtain a current playback environment of audio.

For example, specifically, after receiving an instruction for enabling an audio processing mode by a user, the audio processing apparatus may obtain environment information of a current playback environment during audio playback according to the instruction, and determine the current playback environment according to the environment information.

For example, before obtaining the current playback environment of the audio, recording permission may be obtained. The permission may be used for distinguishing the current playback environment and performing audio mixing with audio being played in the electronic device.

For example, the user wears headphones to watch a video or listen to music or radio. The user may enable the audio processing mode. The electronic device queries, according to an enabling instruction of the user, whether the user agrees to enable microphone permission. After obtaining that the user agrees to enable microphone permission, the electronic device may use the microphone to capture the ambient sound of the current playback environment during audio playback, and then determine the current environment of the user according to the ambient sound, that is, the current playback environment.

The current playback environment may include the following scenarios: classroom, campus, sports field, road, office, cafe, park, construction site, library, and the like. In the embodiments of this application, the user may set a scenario requiring audio processing. The scenario may be set in many ways, for example, flexibly set according to actual requirements or preset and stored in the electronic device.

Step 102: Perform audio recognition on ambient sound of the current playback environment in a case that the current playback environment is in a foreground state.

For example, a microphone may be specifically used to capture the ambient sound of the current playback environment during audio playback. According to the captured ambient sound, an adaptive discriminant network is used to determine whether the current playback environment is in a foreground state or a background state. Audio recognition is performed on the ambient sound of the current playback environment in a case that the current playback environment is in a foreground state. The ambient sound of the current playback environment may be filtered, blocked, or the like in a case that the current playback environment is in a background state.

The foreground state is a state (a scenario) requiring audio mixing, for example, can be an important scenario that is set by a user and in which ambient sound in an environment also needs to be listened to while audio is listened to. For example, the user presets that the scenario requiring audio mixing is classroom, road, or the like. In this case, when the current playback environment is in the scenario of classroom, road, or the like, it can be considered that the current playback environment is in the foreground state. The background state is a state (a scenario) not requiring audio mixing, for example, can be a scenario in which a user can ignore ambient sound around such as ambient white noise, noise of a construction site, or rain sound in a rainy day. The foreground state or the background state may be flexibly set according to an actual application, may be preset and stored in the electronic device, or the like.

Audio recognition may be performed on the ambient sound of the current playback environment in many ways. For example, specifically, if the current playback environment is in the foreground state, the ambient sound of the current playback environment may be sampled, a Mel-frequency cepstrum coefficient feature is extracted from ambient sound obtained through sampling, to obtain a Mel feature of the ambient sound, and audio recognition is performed on the Mel feature of the ambient sound by using the adaptive discriminant network.

A sampling window T can be set for sampling. T is a time required for sampling, and can be flexibly set according to an actual application requirement, for example, can be 1 second.

In this embodiment of this application, the adaptive discriminant network can be specifically trained by another device and then provided to the audio processing apparatus, or trained by the audio processing apparatus itself. To be specific, before the adaptive discriminant network is used, the audio processing method may also include the following steps:

(1) Obtain an ambient sound sample of a target playback environment.

The target playback environment can be an environment that is set by the user and that requires audio processing. For example, a microphone can be specifically used to capture the ambient sound sample of the target playback environment set by the user. The captured ambient sound sample is sent to the audio processing apparatus, so that the audio processing apparatus further processes the captured ambient sound.

(2) Perform adaptive training on a discriminant network by using the ambient sound sample, to obtain the adaptive discriminant network.

For example, specifically, a Mel-frequency cepstrum coefficient feature can be extracted from the ambient sound sample to obtain a Mel feature of the ambient sound sample; the ambient sound sample is classified according to the Mel feature of the ambient sound sample, to obtain a classification result of the ambient sound sample; and adaptive training is performed on a discriminant network by using the Mel feature of the ambient sound sample and the classification result of the ambient sound sample, to obtain the adaptive discriminant network. The classification result of the ambient sound sample can be classifying the ambient sound sample as a foreground sound sample or a background sound sample.

In the sound processing field, a Mel-frequency cepstrum (MFC) is a linear transformation of a logarithmic energy spectrum based on a non-linear Mel scale (MC) of a sound frequency. Mel-frequency cepstrum coefficients (MF CC) are coefficients that form the Mel-frequency cepstrum, and are derived from a cepstrum of audio clips. A difference between the cepstrum and the Mel-frequency cepstrum is that a frequency band of the Mel-frequency cepstrum is equidistantly divided on a Mel scale, and can better approximate the human auditory system than a linearly spaced frequency band used for a normal logarithmic cepstrum.

The ambient sound sample may be classified in many ways according to the Mel feature of the ambient sound sample. To reduce complexity of the problem and calculations, a method of interacting with a user can be used for classification, so that a foreground sound sample and a background sound sample in ambient sound samples are determined by interacting with the user, or the like. For example, interaction with the user is started by using the Mel feature of the ambient sound sample, to obtain a current feature type (label): foreground or background, and a current feature is determined as a foreground sound sample or a background sound sample.

The discriminant network may include a preset Gaussian mixture model, and the performing adaptive training on the discriminant network by using the Mel feature and the classification result of the ambient sound sample, to obtain the adaptive discriminant network may include:
estimating a parameter of a preset Gaussian mixture model by using the Mel feature of the ambient sound sample; and adjusting the estimated parameter according to a true value of the classification result of the ambient sound sample until the preset Gaussian mixture model converges to obtain the adaptive discriminant network.

The Gaussian mixture model is a parameterized model that can smoothly simulate various complex models. At the same time, the Gaussian model has calculations less than those of an algorithm such as machine learning, and has a higher iteration speed. A Gaussian model is a model formed by accurately quantizing an article based on a Gaussian probability density function (a normal distribution curve) and decomposing an article into several articles based on a Gaussian probability density function (a normal distribution curve). In a scenario of this application, only foreground and background need to be distinguished from each other, and the Gaussian mixture model can provide higher accuracy. Besides, different Gaussian mixture models can be used for determining in different scenarios, to reduce interference between models and improve accuracy.

The Gaussian mixture model uses K (generally 3 to 5) Gaussian models to represent audio features, and mainly depends on two parameters: variance and average value. Learning an average value and a variance by using different learning mechanisms directly affects stability, accuracy, and convergence of the model. In a modeling process, parameters such as a variance, an average value, and a weight of the Gaussian mixture model need to be initialized, and data such as a Mahalanobis distance required for modeling is obtained based on the parameters. In an initialization process, generally, the variance can be set to be as large as possible (such as 15) and the weight can be set to be as small as possible (such as 0.001). This is because the initialized Gaussian model is an inaccurate possible model, and needs to be constantly reduced in terms of a range and updated in terms of a parameter during training, to obtain the most possible Gaussian model. The variance is set to be large, to include as much audio into a model as possible to obtain the most possible model.

The parameter may be estimated in many ways, for example, estimated by using an expectation-maximization (EM) algorithm. The expectation-maximization algorithm is an optimized algorithm for performing maximum likelihood estimation (MLE) through iteration. A standard calculation framework of the EM algorithm is alternately formed by an expectation-step (E-step) and a maximization-step (M-step), and convergence of the algorithm can ensure that iteration at least approaches a local maximum value.

The EM algorithm is an optimized algorithm based on the theory of maximum likelihood estimation. When independent observed data $X=\{X_1, \ldots, X_N\}$ and a probability model $f(X,Z,\theta)$ including a hidden variable Z and a parameter $\theta$ are provided, according to the MLE theory, a maximum likelihood value of an optimal single-point estimate of $\theta$ in the model is provided as follows:

$$\theta = \underset{\theta}{\mathrm{argmax}}\ p(X|\theta).$$

In consideration of the hidden variable, likelihood of the model is extended as follows:

$$p(X|\theta) = \int_a^b p(X, Z|\theta)dZ, Z \in [a, b]; \text{ and}$$

$$p(X|\theta) = \sum_{c=1}^{k} p(X, Z_c|\theta) \int_a^b p(X, Z|\theta) dZ, \quad Z = \{Z_1, \ldots, Z_k\}.$$

The hidden variable may indicate absent data or any random variable that cannot be directly observed in the probability model. In the above formula, in the first line, the hidden variable is a continuous variable, and in the second line, the hidden variable is a discrete variable. An integral/summation part is also referred to as joint likelihood (JL) of X, Z. Without loss of generality, the discrete variable is used as an example for illustration herein. Based on a general method of the MLE, a natural logarithm of the above formula may be:

$$\log p(X|\theta) = \log \prod_{i=1}^{N} p(X_i|\theta) = \sum_{i=1}^{N} p(X_i|\theta) = \sum_{i=1}^{N} \log \left[\sum_{c=1}^{k} p(X_i, Z_c|\theta)\right].$$

In the above extension, mutual independence of the observed data is considered. A probability distribution q(Z) related to the hidden variable is introduced, that is, the hidden distribution (it can be considered that the hidden distribution is a posterior distribution of the hidden variable for the observed data, as shown in derivation of an E-step of a standard algorithm). According to the Jensen' inequality, log-likelihood of the observed data has the following unequal relationship:

$$\log p(X|\theta) = \sum_{i=1}^{N} \log\left[\sum_{c=1}^{k} \frac{q(Z_c)}{q(Z_c)} p(X_i, Z_c|\theta)\right] \geq$$
$$\sum_{i=1}^{N} \sum_{c=1}^{k} \left[q(Z_c) \log \frac{p(X_i, Z_c|\theta)}{q(Z_c)}\right] \equiv L(\theta, q)$$

When the right side of the inequality θ, q is a global maximum value, the obtained θ at least ensures that the left side of the inequality is a local maximum value. Therefore, after the right side of the inequality is expressed as L(θ, q), the EM algorithm has the following solution target:

$$\hat{\theta} = \underset{\theta}{\arg\max} L(\theta, q).$$

L(θ, q) in the formula is equivalent to a surrogate function (SF) in a minorize-maximization algorithm (MM algorithm), and is a lower limit in an MLE optimization issue, and the EM algorithm approaches a log-likelihood maximum value by maximizing the surrogate function.

In the Gaussian mixture model in this embodiment, parameter distribution is estimated by using the EM algorithm, and then an estimated parameter is adjusted according to a true value of the ambient sound sample until a likelihood function value of the preset Gaussian mixture model converges, to obtain the adaptive discriminant network.

After the training is completed, verification may be performed on the adaptive discriminant network, for example, an input of the ambient sound sample is received, so that the ambient sound sample is inputted into the Gaussian mixture model. It is observed whether the determining is accurate. If the input of the user is accurate, the training ends. If the input fails, the ambient sound continues to be sampled, a Mel-frequency cepstrum coefficient feature is extracted from an ambient sound sample obtained through sampling, and a subsequent training process continues.

There are many input scenarios of the user and some scenarios may overlap to a great extent. If the user obtains a new Gaussian mixture model after performing training for a new scenario, too many models waste space. Therefore, to reduce the waste of space and a quantity of models, model combination is provided to train a model more finely. The target playback environment may include a plurality of playback scenarios, and the discriminant network may include a plurality of preset Gaussian mixture models, that is, the step "performing adaptive training on a discriminant network by using the ambient sound sample, to obtain the adaptive discriminant network" can include:

training the plurality of preset Gaussian mixture models by using ambient sound samples of the plurality of playback scenarios, to obtain a plurality of Gaussian mixture models; calculating a similarity between two of the plurality of Gaussian mixture models; and determining, in a case that the similarity exceeds a preset threshold, either of two Gaussian mixture models whose similarity exceeds the preset threshold as a Gaussian mixture model of the adaptive discriminant network.

For example, when the target playback environment includes a first playback scenario and a second playback scenario, the preset Gaussian mixture model may be trained by using an ambient sound sample of the first playback scenario, to obtain a first Gaussian mixture model; and the preset Gaussian mixture model may be trained by using an ambient sound sample of the second playback scenario, to obtain a second Gaussian mixture model. A similarity between the first Gaussian mixture model and the second Gaussian mixture model is calculated. If the similarity exceeds a preset threshold, it is considered that the first Gaussian mixture model and the second Gaussian mixture model are similar, and the first Gaussian mixture model is determined as the Gaussian mixture model of the adaptive discriminant network. If the similarity does not exceed the preset threshold, the first Gaussian mixture model and the second Gaussian mixture model are determined as the Gaussian mixture model of the adaptive discriminant network.

The preset threshold may be set in many ways, for example, flexibly set according to actual application requirements or preset and stored in the electronic device. In addition, the preset threshold can be built in an electronic device, or can be stored in a memory and sent to an electronic device, or the like.

A similarity between two Gaussian mixture models may be calculated in many ways, for example, by calculating a distance between the two Gaussian mixture models, that is, the step "calculating a similarity between the first Gaussian mixture model and the second Gaussian mixture model" may include:

calculating a distance between the first Gaussian mixture model and the second Gaussian mixture model according to a parameter of the Gaussian mixture model.

If the similarity exceeds the preset threshold (a first preset threshold), the first Gaussian mixture model is determined as the Gaussian mixture model of the adaptive discriminant network. If the similarity does not exceed the preset threshold, the first Gaussian mixture model and the second Gaussian mixture model are determined as the Gaussian mixture model of the adaptive discriminant network. This may include: if the distance is less than a preset threshold (a second preset threshold), the first Gaussian mixture model is determined as the Gaussian mixture model of the adaptive discriminant network, and if the distance is not less than the preset threshold, the first Gaussian mixture model and the second Gaussian mixture model are determined as the Gaussian mixture model of the adaptive discriminant network.

For example, a Gaussian mixture model $GMM_{pre}^i$ is obtained after the user performs training for a scenario, and a new Gaussian mixture model $GMM_{pre}^j$ is obtained after the user performs training for a new scenario. The parameter of the Gaussian mixture model is as follows:

$GMM_{pre}^i=\{\mu,\sigma,\alpha\}_k, k=1 \ldots 5.$

The above formula shows that the Gaussian mixture model is formed by K Gaussian models whose parameters are $\mu$, $\sigma$, $\alpha$, where $\alpha$ is a weighted coefficient of a current Gaussian model. Based on a parameter feature in the Gaussian mixture model, a fast distance estimation method is provided, to quickly determine a similarity between models. A distance estimation formula is as follows:

$$distance_{ij} = \frac{\sum_{i=0}^{i=k}\alpha_i \sum_{m=0}^{m=k}\alpha_m^j * (\|\mu_i - \mu_m^j\| + \|\sigma_i - \sigma_m^j\|)}{\sum_{i=0}^{i=k}\alpha_i \sum_{i=0}^{i=k}\alpha_i * (\|\mu_i + \partial\mu_i\| + \|\sigma_i + \partial\sigma_i\|)}.$$

When the distance is less than the preset threshold, it can be considered that Gaussian mixture models are similar. In the formula, $\partial$ is a maximum distance factor, and represents that a maximum tolerable distance is a mirror of a current Gaussian model. The distance between the Gaussian mixture models can be quickly estimated by using the distance formula, to reduce a quantity of models.

Step 103: Determine foreground sound in the ambient sound according to an audio recognition result.

For example, specifically, the ambient sound may be classified according to the Mel feature of the ambient sound, to obtain the foreground sound and background sound in the ambient sound; and the foreground sound in the ambient sound may be obtained from the foreground sound and the background sound in the ambient sound.

The foreground sound can be sound such as conversation sound and alert sound that includes important information. The background sound can be sound such as ambient white noise and rain sound that a user can ignore.

Step 104: Classify the foreground sound in the ambient sound to determine a type of the foreground sound.

For example, specifically, types of the audio may be obtained; the foreground sound may be classified based on the types, to obtain a confidence level of the foreground sound in each type; and a type with the highest confidence level may be determined as the type of the foreground sound.

The confidence level is also referred to as a reliability degree, a confidence degree, or a confidence coefficient. To be specific, when overall parameters are estimated through sampling, because of randomness of samples, a conclusion is always uncertain. Therefore, a probability statement method is used, that is, an interval estimation method in mathematical statistics. To be specific, when an estimated value and overall parameters fall within an allowable error range, there is a corresponding probability. The corresponding probability is referred to as a confidence level.

The confidence level is an important indicator for describing uncertainty of locations of a line element and a plane element in a geographic information system (GIS). The confidence level indicates a certainty degree of interval estimation, and a span of a confidence interval is a positive function of a confidence level. To be specific, if a higher certainty degree is required, a wider confidence interval is certainly obtained, which reduces accuracy of estimation correspondingly.

As the confidence interval is wider, the confidence level is higher. The confidence interval is only used in frequency statistics collection. A corresponding concept in Bayesian statistics is credible interval. However, the credible interval and the confidence interval are based on different concepts, and therefore generically do not have the same value. The confidence interval is an interval of an estimated value that is calculated. The confidence level indicates a probability that an exact value falls within the interval.

The confidence level is a probability that overall parameters fall within an interval of sample statistics values. The confidence interval is a range of errors between sample statistic values and overall parameters at a confidence level. As the confidence interval is wider, the confidence level is higher.

The audio can have many types, for example, conversation sound, music sound, alert sound, and alarm sound. For example, a feature in an audio training set can be used to train a support vector machine, and the type of the audio is determined according to a training result.

The foreground sound may be classified based on the type in many ways, for example, by calculating a distance between the foreground sound and the type, that is, the step "classifying the foreground sound based on the types, to obtain a confidence level of the foreground sound in each type" can include:

calculating a distance between the Mel feature of the foreground sound and each type, and determining, according to the distance, a probability that the foreground sound belongs to each type; and the determining a type with the highest confidence level as the type of the foreground sound may include: determining a type with the highest probability of the types as the type of the foreground sound.

Step 105: Perform audio mixing on the foreground sound and the audio to obtain mixed playback sound based on the type of the foreground sound.

For example, specifically, an audio mixing mode may be determined according to the type of the foreground sound; and audio mixing may be performed on the foreground sound and the audio by using the determined audio mixing mode, to obtain the mixed playback sound. For example, during audio mixing, an input is divided into two parts: an ambient sound input EnvInput and an audio input VideoInput. An output is Output. At an audio mixing stage, a linear superposition method is used, and a formula is as follows:

Output=$a$*EnvInput+$b$*VideoInput.

$a$ and $b$ are superposition coefficients. Different superposition coefficients can be used according to different types.

As can be seen from above, in this embodiment, a current playback environment of audio may be obtained; audio recognition may be performed on ambient sound of the current playback environment in a case that the current playback environment is in a foreground state; then, foreground sound in the ambient sound may be determined according to an audio recognition result; next, the foreground sound in the ambient sound may be classified to determine a type of the foreground sound; and audio mixing may be performed on the foreground sound and the audio to obtain mixed playback sound based on the type of the foreground sound. In the solution, the ambient sound during audio playback may be obtained, a current playback state may be then inferred according to the ambient sound, and audio mixing may be performed according to the current playback state with reference to the currently played audio. Therefore, this can effectively improve flexibility of audio playback. Besides, the user can always pay attention to environment information around when playing the audio while wearing headphones, and obtain more secure and convenient listening experience.

According to the method described in the previous embodiment, the following further provides detailed description by using an example.

In this embodiment, for example, the audio processing apparatus is specifically integrated in an electronic device.

Figure 2A:
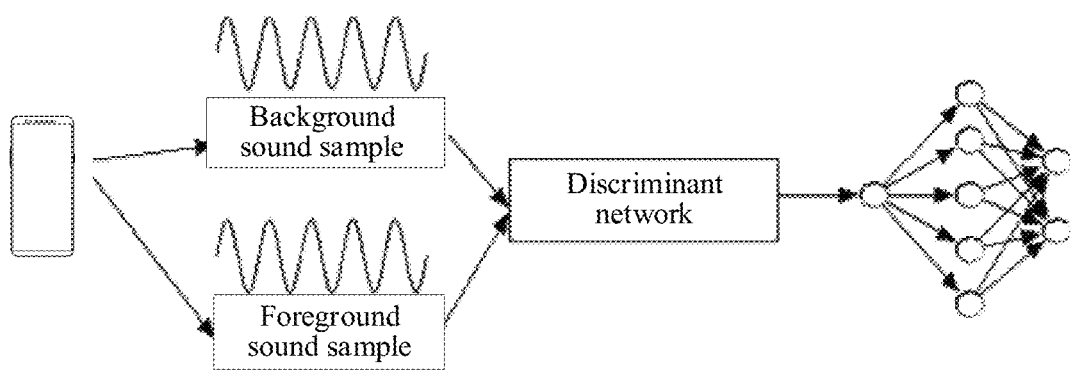
FIG. 2a is a schematic diagram of a training process of an adaptive discriminant network according to an embodiment of this application.

1. First, the discriminant network needs to be trained. As shown in FIG. 2a, this can specifically include the following steps.

(1) An electronic device obtains an ambient sound sample of a target playback environment.

For example, the user can set classroom, road, or the like as the target playback environment requiring audio processing. For example, a microphone can be specifically used to capture the ambient sound sample of the target playback environment. The captured ambient sound sample is sent to the electronic device, so that the electronic device further processes the captured ambient sound.

(2) The electronic device performs adaptive training on a discriminant network by using the ambient sound sample, to obtain the adaptive discriminant network.

For example, to reduce complexity of the problem and calculations, the electronic device may specifically extract a Mel-frequency cepstrum coefficient feature from the ambient sound sample to obtain a Mel feature of the ambient sound sample; then, determine whether the ambient sound sample is a foreground sound sample or a background sound sample according to the Mel feature of the ambient sound sample by interacting with the user; and next, perform adaptive training on a discriminant network by using the Mel feature and the classification result of the ambient sound sample, to obtain the adaptive discriminant network. For example, the Gaussian mixture model $GMM_{pre}^i$ can be first initialized and includes 5 Gaussian models, sampling is performed in a sampling window T, an MFCC feature is extracted, and interaction with the user is started to obtain a current feature label: foreground or background. The extracted MFCC feature is inputted into the Gaussian mixture model to estimate a parameter, and the parameter is estimated by using the EM algorithm.

The discriminant network may include a preset Gaussian mixture model. For example, specifically, a parameter of the preset Gaussian mixture model is estimated based on an expectation-maximization algorithm by using the Mel feature of the ambient sound sample; a true value of a classification result obtained by interacting with the user is obtained; and the estimated parameter is adjusted according to the true value until a likelihood function value of the preset Gaussian mixture model converges to obtain the adaptive discriminant network.

For example, the Gaussian mixture model $GMM_{pre}^i$ can be first initialized and includes 5 Gaussian models, sampling is performed in a sampling window T, an MFCC feature is extracted, and interaction with the user is started to obtain a current feature label: foreground or background. The extracted MFCC feature is inputted into the Gaussian mixture model to estimate a parameter, and the parameter is estimated by using the EM algorithm.

After the training is completed, verification may be performed on the adaptive discriminant network, for example, an input of the ambient sound sample is received, so that the ambient sound sample is inputted into the Gaussian mixture model. It is observed whether the determining is accurate. If the input of the user is accurate, the training ends. If the input fails, the ambient sound continues to be sampled, a Mel-frequency cepstrum coefficient feature is extracted from ambient sound sample obtained through sampling, and a subsequent training process such as parameter estimation continues.

There are many input scenarios of the user and some scenarios may overlap to a great extent. If the user obtains a new Gaussian mixture model after performing training for a new scenario, too many models waste space. Therefore, to reduce the waste of space and a quantity of models, model combination is provided to train a model more finely. For example, the target playback environment may include a plurality of playback scenarios, and the discriminant network may include a plurality of preset Gaussian mixture models. In this case, specifically, the preset Gaussian mixture model can be trained by using ambient sound samples of the plurality of playback scenarios to obtain a plurality of Gaussian mixture models; a similarity between two of the plurality of Gaussian mixture models may be calculated; and either of two Gaussian mixture models whose similarity exceeds the preset threshold may be determined as a Gaussian mixture model of the adaptive discriminant network in a case that the similarity exceeds a preset threshold (a first preset threshold). Certainly, models can also be combined in other ways.

For example, when the target playback environment includes a first playback scenario and a second playback scenario, the preset Gaussian mixture model may be trained by using an ambient sound sample of the first playback scenario, to obtain a first Gaussian mixture model; and the preset Gaussian mixture model may be trained by using an ambient sound sample of the second playback scenario, to obtain a second Gaussian mixture model. Then, a distance between the first Gaussian mixture model and the second Gaussian mixture model is calculated according to a parameter of the Gaussian mixture model. If the distance is less than a preset threshold (a second preset threshold), the first Gaussian mixture model is determined as the Gaussian mixture model of the adaptive discriminant network. If the distance is not less than the preset threshold, the first Gaussian mixture model and the second Gaussian mixture model are determined as the Gaussian mixture model of the adaptive discriminant network.

For example, the preset threshold (the second preset threshold) may be set to 1 herein. When the distance is less than 1, it is considered that the two Gaussian mixture models are similar, and either of the two Gaussian mixture models can be used as the Gaussian mixture models of the two playback scenarios, that is, the first Gaussian mixture model is determined as the Gaussian mixture model of the adaptive discriminant network. The first Gaussian mixture model is any one of a plurality of similar Gaussian mixture models.

Figure 2B:
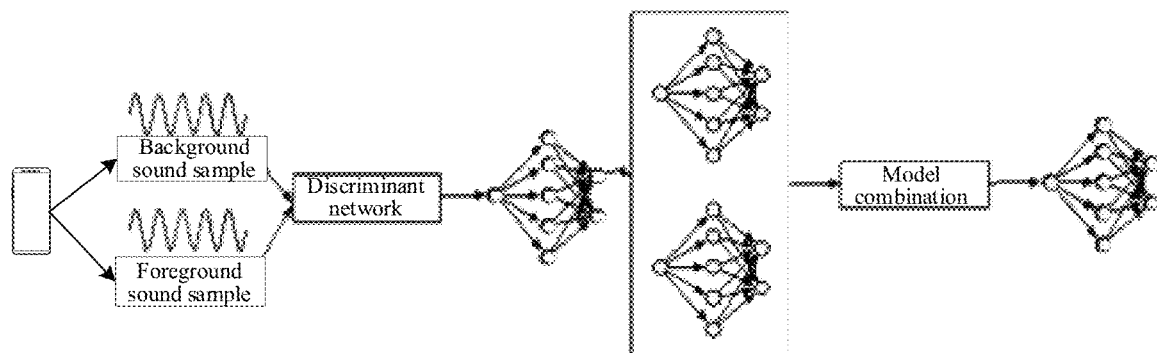
FIG. 2b is a schematic diagram of another training process of an adaptive discriminant network according to an embodiment of this application.

For example, as shown in FIG. 2b, a Gaussian mixture model $GMM_{pre}^i$ is obtained after the user performs training for a scenario, and a new Gaussian mixture model $GMM_{pre}^j$ is obtained after the user performs training for a new scenario. The parameter of the Gaussian mixture model is as follows:

$$GMM_{pre}^i = \{\mu, \sigma, \alpha\}_k, k=1, \ldots 5.$$

The above formula shows that the Gaussian mixture model is formed by K Gaussian models whose parameters are μ, σ, α, where α is a weighted coefficient of the current Gaussian model. Based on a parameter feature in the Gaussian mixture model, a fast distance estimation method is provided, to quickly determine a similarity between models. A distance estimation formula is as follows:

$$\text{distance}_{ij} = \frac{\sum_{i=0}^{i=k} \alpha_i \sum_{m=0}^{m=k} \alpha_m^j * (\|\mu_i - \mu_m^j\| + \|\sigma_i - \sigma_m^j\|)}{\sum_{i=0}^{i=k} \alpha_i \sum_{i=0}^{i=k} \alpha_i * (\|\mu_i + \partial \mu_i\| + \|\sigma_i + \partial \sigma_i\|)}.$$

When the distance is less than the preset threshold, it can be considered that Gaussian mixture models are similar. In the formula, $\partial$ is a maximum distance factor, and represents that a maximum tolerable distance is a mirror of a current Gaussian model, for example, may be $\partial=0.1$. The distance between the Gaussian mixture models can be quickly estimated by using the distance formula, to reduce a quantity of models.

2. Audio processing can be performed through the trained adaptive discriminant network. For details, refer to FIG. 2c, FIG. 2d, and FIG. 2e.

Figure 2C:
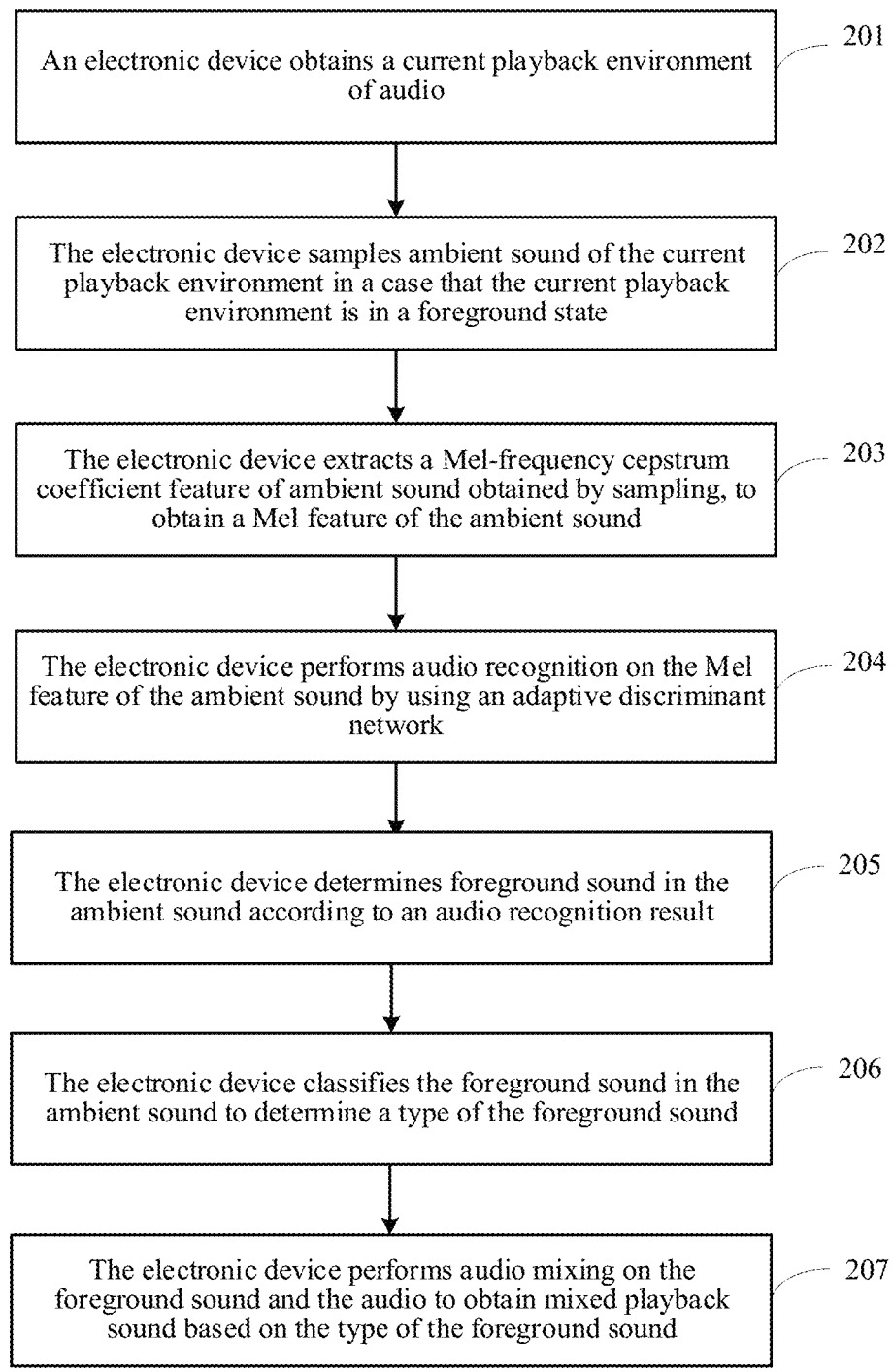
FIG. 2c is a second flowchart of an audio processing method according to an embodiment of this application.
Figure 2D:
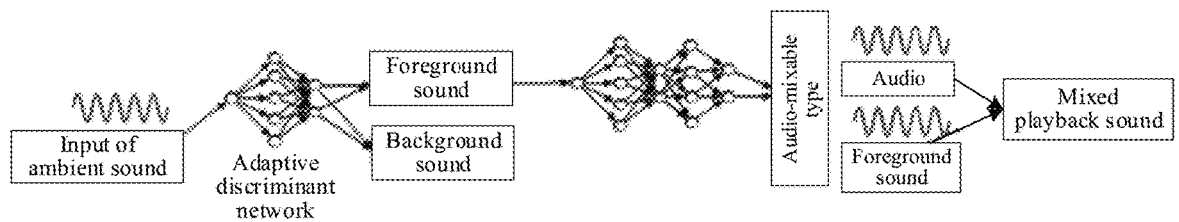
FIG. 2d is a third flowchart of an audio processing method according to an embodiment of this application.
Figure 2E:
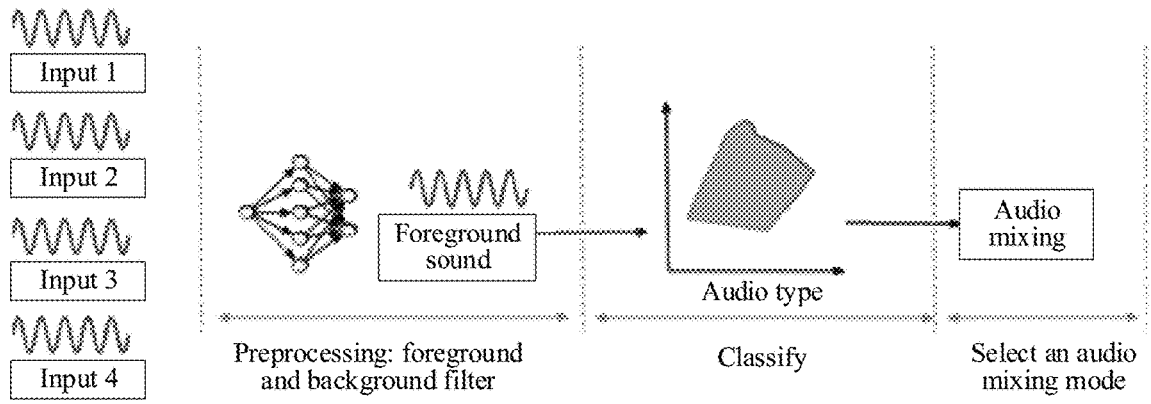
FIG. 2e is a fourth flowchart of an audio processing method according to an embodiment of this application.

As shown in FIG. 2c, a specific procedure of an audio processing method can include the following steps.

Step 201: An electronic device obtains a current playback environment of audio.

For example, specifically, the user may select to enable the audio processing mode in a player of the electronic device when wearing headphones to watch a video. After receiving an instruction for enabling the audio processing mode by the user, the electronic device queries, according to the enabling instruction of the user, whether the user agrees to enable microphone permission. After obtaining that the user agrees to enable microphone permission, the electronic device may use the microphone to capture the ambient sound of the current playback environment during audio playback, and then determine the current environment of the user according to the ambient sound.

During determining of the current playback environment of the user, a traditional algorithm continuously detects and distinguishes current ambient sound, and the continuous detection method causes huge performance loss. Besides, due to the diversity of environments of users, this method also brings great challenges to recognition accuracy. Therefore, this embodiment provides a dynamic adaptive determining method, and adds user feedback through user interaction, and the Gaussian mixture model is used to dynamically update foreground and background discriminant networks to adapt to different playback environments of users.

For example, the user can set a foreground state before enabling the audio processing mode. For example, the user presets that a scenario requiring audio mixing is classroom or road.

Step 202: The electronic device samples ambient sound of the current playback environment in a case that the current playback environment is in a foreground state.

For example, the electronic device can specifically determine whether the current playback environment is in the foreground state or a background state. If the current playback environment is in the foreground state, the electronic device can sample the ambient sound of the current playback environment. For example, a sampling window T can be set and is a time required for sampling and can be 1 second.

Step 203: The electronic device extracts a Mel-frequency cepstrum coefficient feature of ambient sound obtained by sampling, to obtain a Mel feature of the ambient sound.

For example, to ensure that an audio feature of the ambient sound more conforms to the auditory property of human ears, and there is still good recognition performance when a signal-to-noise ratio is reduced, the electronic equipment can specifically extract the Mel-frequency cepstrum coefficient feature of the ambient sound to obtain the Mel feature of the ambient sound.

Step 204: The electronic device performs audio recognition on the Mel feature of the ambient sound by using an adaptive discriminant network.

For example, the electronic device can specifically input the Mel feature of the ambient sound into the trained adaptive discriminant network, perform audio recognition by using the adaptive discriminant network, and recognize foreground sound and background sound in the ambient sound.

Step 205: The electronic device determines foreground sound in the ambient sound according to an audio recognition result.

For example, specifically, the electronic device may classify the ambient sound according to the Mel feature of the ambient sound, to determine the foreground sound and background sound in the ambient sound; and select the foreground sound in the ambient sound from the determined foreground sound and background sound.

Step 206: The electronic device classifies the foreground sound in the ambient sound to determine a type of the foreground sound.

For example, specifically, the electronic device may obtain types of the audio; may classify the foreground sound based on the types, to obtain a confidence level of the foreground sound in each type; and may determine a type with the highest confidence level as the type of the foreground sound.

For example, a classification algorithm based on a support vector machine (SVM) can be used, a Youtube-8K training set is used as a training set, and obtained audio types can be conversation sound, music sound, and alert sound.

For example, specifically, a distance between the Mel feature of the foreground sound and each type may be calculated, a probability that the foreground sound belongs to each type may be determined according to the distance; and a type with the highest probability of types may be determined as the type of the foreground sound.

Step 207: The electronic device performs audio mixing on the foreground sound and the audio to obtain mixed playback sound based on the type of the foreground sound.

For example, specifically, an audio mixing mode may be determined according to the type of the foreground sound; and audio mixing may be performed on the foreground sound and the audio by using the determined audio mixing mode, to obtain the mixed playback sound. For example, during audio mixing, an input is divided into two parts: an ambient sound input EnvInput and an audio input VideoInput. An output is Output. At an audio mixing stage, a linear superposition method is used, and a formula is as follows:

$$\text{Output}=a*\text{EnvInput}+b*\text{VideoInput}.$$

a and b are superposition coefficients. Different superposition coefficients can be used according to different types. Specifically, setting may be as follows:

$$\begin{cases} \text{conversation: } \{a = 0.7, b = 0.3\} \\ \text{music: } \{a = 0.5, b = 0.5\} \\ \text{alert: } \{a = 0.9, b = 0.1\} \end{cases}.$$

For example, when the foreground sound is conversation sound, audio mixing can be performed on the foreground sound and the audio in an audio mixing mode of conversation; when the foreground sound is music sound, audio mixing can be performed on the foreground sound and the audio in an audio mixing mode of music; and when the foreground sound is alert sound, audio mixing can be performed on the foreground sound and the audio in an audio mixing mode of alert.

As can be seen from above, in this embodiment, a current playback environment of audio may be obtained; audio recognition may be performed on ambient sound of the current playback environment in a case that the current playback environment is in a foreground state; then, foreground sound in the ambient sound may be determined according to an audio recognition result; next, the foreground sound in the ambient sound may be classified to determine a type of the foreground sound; and audio mixing may be performed on the foreground sound and the audio to obtain mixed playback sound based on the type of the foreground sound. In the solution, the electronic device may obtain the ambient sound during audio playback, may then infer a current playback state according to the ambient sound, and may perform audio mixing according to the current playback state with reference to the currently played audio. Therefore, this can effectively improve flexibility of audio playback. Besides, the user can always pay attention to environment information around when playing the audio while wearing headphones, and obtain more secure and convenient listening experience. This solution is applied to a player of an electronic device. When the audio processing mode is enabled in the player and the user wears headphones to watch a video, listen to music or radio, or the like, the current playback environment of the user can be obtained, and according to the method in this solution, it is determined when to arouse and use an audio mixing strategy, so that the user can conveniently receive audio information of an external environment, improve viewing experience, and always know external environment information when focusing on watching a video.

To better implement the above method, correspondingly, the embodiments of this application also provide an audio processing apparatus. The audio processing apparatus may be integrated in an electronic device, and the electronic device may be a server or a device such as a terminal.

Figure 3:
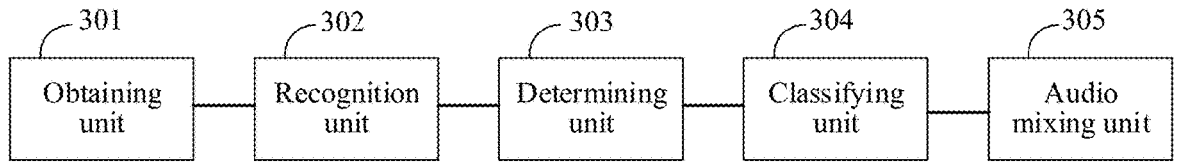
FIG. 3 is a schematic structural diagram of an audio processing apparatus according to an embodiment of this application.

For example, as shown in FIG. 3, the audio processing apparatus may include an obtaining unit 301, a recognition unit 302, a determining unit 303, a classification unit 304, and an audio mixing unit 305.

The obtaining unit 301 is configured to obtain a current playback environment of audio.

For example, after receiving an instruction for enabling an audio processing mode by a user, the obtaining unit 301 may specifically obtain the current playback environment during audio playback according to the instruction.

For example, the user wears headphones to watch a video or listen to music and radio. The user may enable the audio processing mode. The obtaining unit 301 queries, according to an enabling instruction of the user, whether the user agrees to enable microphone permission. After obtaining that the user agrees to enable microphone permission, the obtaining unit 301 may use the microphone to capture the ambient sound of the current playback environment during audio playback, and then determine the current environment of the user according to the ambient sound, that is, the current playback environment.

The current playback environment may include the following scenarios: classroom, campus, sports field, road, office, cafe, park, construction site, library, and the like. In the embodiments of this application, the user may set a scenario requiring audio processing. The scenario may be set in many ways, for example, flexibly set according to actual requirements or preset and stored in the electronic device.

The recognition unit 302 is configured to perform audio recognition on ambient sound of the current playback environment in a case that the current playback environment is in a foreground state.

In some embodiments, the recognition unit 302 may be specifically configured to: sample the ambient sound of the current playback environment in a case that the current playback environment is in the foreground state, extract a Mel-frequency cepstrum coefficient feature from ambient sound obtained through sampling, to obtain a Mel feature of the ambient sound, and perform audio recognition on the Mel feature of the ambient sound by using the adaptive discriminant network.

In some embodiments, the audio processing apparatus may also include a training unit, configured to obtain an ambient sound sample of a target playback environment, and perform adaptive training on a discriminant network by using the ambient sound sample, to obtain the adaptive discriminant network.

In some embodiments, the training unit may include an extraction subunit and a training subunit.

The extraction subunit is configured to extract a Mel-frequency cepstrum coefficient feature from the ambient sound sample to obtain a Mel feature of the ambient sound sample; and classify the ambient sound sample according to the Mel feature of the ambient sound sample, to obtain a classification result of the ambient sound sample.

The training subunit is configured to perform adaptive training on the discriminant network by using the Mel feature and the classification result of the ambient sound sample, to obtain the adaptive discriminant network.

In some embodiments, the discriminant network includes a preset Gaussian mixture model. The training subunit may be specifically configured to estimate a parameter of a preset Gaussian mixture model by using the Mel feature of the ambient sound sample; and adjust the estimated parameter according to a true value of the classification result of the ambient sound sample until the preset Gaussian mixture model converges to obtain the adaptive discriminant network.

In some embodiments, the target playback environment includes a plurality of playback scenarios, and the discriminant network includes a plurality of preset Gaussian mixture models. The training subunit may be specifically configured to: train the plurality of preset Gaussian mixture models by using ambient sound samples of the plurality of playback scenarios, to obtain a plurality of Gaussian mixture models; calculate a similarity between two of the plurality of Gaussian mixture models; and determine, in a case that the similarity exceeds a preset threshold, either of two Gaussian mixture models whose similarity exceeds the preset threshold as a Gaussian mixture model of the adaptive discriminant network.

For example, when the target playback environment includes a first playback scenario and a second playback scenario, the preset Gaussian mixture model may be trained by using an ambient sound sample of the first playback scenario, to obtain a first Gaussian mixture model; and the preset Gaussian mixture model may be trained by using an ambient sound sample of the second playback scenario, to obtain a second Gaussian mixture model. A similarity between the first Gaussian mixture model and the second Gaussian mixture model is calculated. If the similarity exceeds a preset threshold, the first Gaussian mixture model is determined as the Gaussian mixture model of the adaptive discriminant network. If the similarity does not exceed the preset threshold, the first Gaussian mixture model and the second Gaussian mixture model are determined as the Gaussian mixture model of the adaptive discriminant network.

The determining unit 303 is configured to determine foreground sound in the ambient sound according to an audio recognition result.

In some embodiments, the determining unit 303 may be specifically configured to classify the ambient sound according to the Mel feature of the ambient sound, to obtain the foreground sound and background sound in the ambient sound; and obtain the foreground sound in the ambient sound from the foreground sound and the background sound in the ambient sound.

The classifying unit 304 is configured to classify the foreground sound in the ambient sound to determine a type of the foreground sound.

In some embodiments, the classification unit 304 may include a classification subunit and a determining subunit.

The classification subunit is configured to obtain types of the audio; and classify the foreground sound based on the types, to obtain a confidence level of the foreground sound in each type.

The determining subunit is configured to determine a type with the highest confidence level as the type of the foreground sound.

In some embodiments, the classification subunit may be specifically configured to: calculate a distance between the Mel feature of the foreground sound and each type, and determine, according to the distance, a probability that the foreground sound belongs to each type; and the determining subunit may be specifically configured to determine a type with the highest probability of types as the type of the foreground sound.

The audio mixing unit 305 is configured to perform audio mixing on the foreground sound and the audio to obtain mixed playback sound based on the type of the foreground sound.

In some embodiments, the audio mixing unit 305 may be specifically configured to: determine an audio mixing mode according to the type of the foreground sound; and perform audio mixing on the foreground sound and the audio by using the determined audio mixing mode, to obtain the mixed playback sound.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

As can be seen from above, in this embodiment, the obtaining unit 301 obtains a current playback environment of audio; the recognition unit 302 performs audio recognition on ambient sound of the current playback environment in a case that the current playback environment is in a foreground state; then, the determining unit 303 determines foreground sound in the ambient sound according to an audio recognition result; next, the classification unit 304 classifies the foreground sound in the ambient sound to determine a type of the foreground sound; and the audio mixing unit 305 performs audio mixing on the foreground sound and the audio to obtain mixed playback sound based on the type of the foreground sound. In the solution, the ambient sound during audio playback may be obtained through environment sensing, a current playback state may be then inferred according to the ambient sound, and audio mixing may be performed according to the current playback state with reference to the currently played audio. Therefore, this can effectively improve flexibility of audio playback. Besides, the user can always pay attention to environment information around when playing the audio while wearing headphones, and obtain more secure and convenient listening experience.

Figure 4:
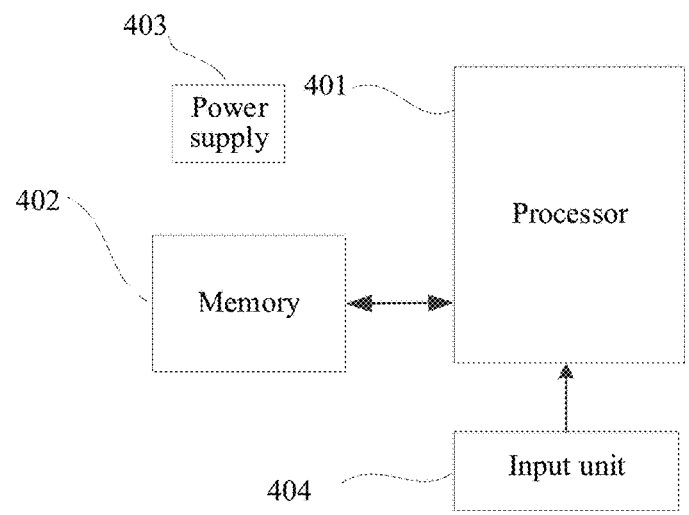
FIG. 4 is a schematic structural diagram of an electronic device according to an embodiment of this application.

In addition, the embodiments of this application also provide an electronic device. FIG. 4 is a schematic structural diagram of an electronic device according to an embodiment of this application. Details are as follows:

The electronic device may include a processor 401 including one or more processing cores, a memory 402 including one or more computer-readable storage mediums, a power supply 403, an input unit 404, and other components. A person skilled in the art may understand that the electronic device structure shown in FIG. 4 does not constitute a limitation to the electronic device. The electronic device may include more or fewer component than those shown in the figure, may combine some component, or may have different component arrangements.

The processor 401 is a control center of the electronic device and connects all parts of the electronic device using various interfaces and circuits. By running or executing software programs and/or modules stored in the memory 402 and by calling data stored in the memory 402, the processor 401 implements various functions of the electronic device and processes data, thus performing overall monitoring on the electronic device. In this embodiment of this application, the processor 401 may include one or more processing cores. In this embodiment of this application, the processor 401 may integrate an application processor and a modem processor. The application processor mainly deals with an operating system, a user interface, an application program, and the like. The modem processor mainly deals with wireless communication. It can be understood that alternatively, the modem processor may not be integrated into the processor 401.

The memory 402 may be configured to store software programs and modules. The processor 401 executes various functional applications and data processing by running the software programs and modules stored in the memory 402. The memory 402 may mainly include a program storage area and a data storage area. The program storage area may store an operating system, an application program required by at least one function (such as a sound playback function and an image playback function), and the like. The data storage area may store data created based on use of the electronic device, and the like. In addition, the memory 402 may include a high-speed random access memory or a nonvolatile memory, for example, at least one magnetic disk storage device, a flash memory, or another volatile solid-state storage device. Correspondingly, the memory 402 may also include a memory controller to provide the processor 401 with access to the memory 402.

The electronic device may include the power supply 403 supplying power to each component. In this embodiment of this application, the power supply 403 may be logically connected to the processor 401 by using a power management system, so as to implement functions such as charging management, discharging management and power consumption management by using the power management system. The power supply 403 may also include any component such as one or more DC or AC power supplies, a recharging system, a power failure detection circuit, a power converter or inverter, and a power status indicator.

The electronic device may further include the input unit 404. The input unit 404 may be configured to receive inputted digit or character information and generate keyboard, mouse, joystick, optical, or trackball signal inputs related to user setting and function control.

Although not shown, the electronic device may also include a display unit and the like. This is not repeated herein. Specifically, in this embodiment, the processor 401 in the electronic device loads executable files corresponding to processes of one or more application programs into the memory 402 according to the following instructions, and the processor 401 runs the application programs stored in the memory 402, to perform various functions as follows:

obtaining a current playback environment of audio; performing audio recognition on ambient sound of the current playback environment in a case that the current playback environment is in a foreground state; determining foreground sound in the ambient sound according to an audio recognition result; classifying the foreground sound in the ambient sound to determine a type of the foreground sound; and performing audio mixing on the foreground sound and the audio to obtain mixed playback sound based on the type of the foreground sound.

For specific implementation of the foregoing operations, reference may be made to the foregoing embodiments. Details are not described herein again.

As can be seen from above, in this embodiment, a current playback environment of audio may be obtained; audio recognition may be performed on ambient sound of the current playback environment in a case that the current playback environment is in a foreground state; then, foreground sound in the ambient sound may be determined according to an audio recognition result; next, the foreground sound in the ambient sound may be classified to determine a type of the foreground sound; and audio mixing may be performed on the foreground sound and the audio to obtain mixed playback sound based on the type of the foreground sound. In the solution, the ambient sound during audio playback may be obtained through environment sensing, a current playback state may be then inferred according to the ambient sound, and audio mixing may be performed according to the current playback state with reference to the currently played audio. Therefore, this can effectively improve flexibility of audio playback. Besides, the user can always pay attention to environment information around when playing the audio while wearing headphones, and obtain more secure and convenient listening experience.

A person of ordinary skill in the art may understand that, all or some steps of the methods in the foregoing embodiments may be implemented by using instructions, or implemented through instructions controlling relevant hardware, and the instructions may be stored in a computer-readable memory and loaded and executed by a processor.

In view of this, the embodiments of this application further provide a computer-readable storage medium, storing a plurality of instructions, and the instructions can be loaded by a processor, to perform the steps of any audio processing method provided in the embodiments of this application. For example, the instructions may perform the following steps:

obtaining a current playback environment of audio; performing audio recognition on ambient sound of the current playback environment in a case that the current playback environment is in a foreground state; determining foreground sound in the ambient sound according to an audio recognition result; classifying the foreground sound in the ambient sound to determine a type of the foreground sound; and performing audio mixing on the foreground sound and the audio to obtain mixed playback sound based on the type of the foreground sound.

For specific implementation of the foregoing operations, reference may be made to the foregoing embodiments. Details are not described herein again.

The storage medium may include, for example, a read-only memory (ROM), a random access memory (RAM), a magnetic disk, or an optical disc.

Because instructions stored in the storage medium can execute the steps in any audio processing method provided in the embodiments of this application, beneficial effects that can be achieved in any audio processing method provided in the embodiments of this application can be achieved. For details, refer to the above embodiments. This is not repeated herein.

The audio processing method and apparatus, the electronic device, and the storage medium provided in the embodiments of this application are described in detail above. Specific examples are used in this specification to illustrate the principles and implementations of this application. Descriptions of the above embodiments only intend to help understand the method and the core idea of this application. Besides, those skilled in the art can change specific implementations and the scope of application according to the idea of this application. In summary, the content of this specification is not understood as a limitation on this application.

What is claimed is:

1. An audio processing method, executed by an electronic device, and comprising:
  obtaining a current playback environment of audio;
  performing audio recognition on ambient sound of the current playback environment;
  determining foreground sound in the ambient sound according to an audio recognition result;
  classifying the foreground sound in the ambient sound to determine a type of the foreground sound; and
  performing audio mixing on the foreground sound and the audio to obtain a mixed playback sound based on the type of the foreground sound, comprising:
    determining an audio mixing mode according to the type of the foreground sound; and
    performing audio mixing on the foreground sound and the audio by using the determined audio mixing mode to obtain the mixed playback sound.

2. The method according to claim 1, wherein the performing audio recognition on ambient sound of the current playback environment comprises:
  sampling the ambient sound of the current playback environment;

extracting a Mel-frequency cepstrum coefficient feature of the ambient sound obtained by the sampling, to obtain a Mel feature of the ambient sound; and performing audio recognition on the Mel feature of the ambient sound by using an adaptive discriminant network.

3. The method according to claim 2, wherein the determining foreground sound in the ambient sound according to an audio recognition result comprises:

classifying the ambient sound according to the Mel feature of the ambient sound, to obtain the foreground sound and background sound in the ambient sound; and obtaining the foreground sound in the ambient sound from the foreground sound and the background sound in the ambient sound.

4. The method according to claim 2, wherein the classifying the foreground sound in the ambient sound to determine a type of the foreground sound comprises:

obtaining types of the audio;

classifying the foreground sound based on the types, to obtain a confidence level of the foreground sound in each type; and determining a type with a highest confidence level as the type of the foreground sound.

5. The method according to claim 4, wherein the classifying the foreground sound based on the types, to obtain a confidence level of the foreground sound in each type comprises:

calculating a distance between the Mel feature of the foreground sound and each type, and determining, according to the distance, a probability that the foreground sound belongs to each type; and the determining a type with the highest confidence level as the type of the foreground sound comprises: determining a type with a highest probability of the types as the type of the foreground sound.

6. The method according to claim 2, further comprising:

before the performing audio recognition on the Mel feature of the ambient sound by using an adaptive discriminant network:

obtaining an ambient sound sample of a target playback environment; and performing adaptive training on a discriminant network by using the ambient sound sample, to obtain the adaptive discriminant network.

7. The method according to claim 6, wherein the performing adaptive training on a discriminant network by using the ambient sound sample, to obtain the adaptive discriminant network comprises:

extracting a Mel-frequency cepstrum coefficient feature of the ambient sound sample, to obtain a Mel feature of the ambient sound sample;

classifying the ambient sound sample according to the Mel feature of the ambient sound sample, to obtain a classification result of the ambient sound sample; and performing adaptive training on the discriminant network by using the Mel feature of the ambient sound sample and the classification result of the ambient sound sample, to obtain the adaptive discriminant network.

8. The method according to claim 7, wherein the discriminant network comprises a preset Gaussian mixture model, and the performing adaptive training on the discriminant network by using the Mel feature of the ambient sound sample and the classification result of the ambient sound sample, to obtain the adaptive discriminant network comprises:

estimating a parameter of a preset Gaussian mixture model by using the Mel feature of the ambient sound sample; and adjusting the estimated parameter according to a true value of the classification result of the ambient sound sample until the preset Gaussian mixture model converges to obtain the adaptive discriminant network.

9. The method according to claim 6, wherein the target playback environment comprises a plurality of playback scenarios, and the discriminant network comprises a plurality of preset Gaussian mixture models; and the performing adaptive training on a discriminant network by using the ambient sound sample, to obtain the adaptive discriminant network comprises:

training the plurality of preset Gaussian mixture models by using ambient sound samples of the plurality of playback scenarios, to obtain a plurality of Gaussian mixture models;

calculating a similarity between two of the plurality of Gaussian mixture models; and determining, in a case that the similarity exceeds a preset threshold, either of two Gaussian mixture models whose similarity exceeds the preset threshold as a Gaussian mixture model of the adaptive discriminant network.

10. A non-transitory computer-readable storage medium storing a plurality of instructions, the plurality of instructions being executable by a processor, and when executed by the processor, cause the processor to:

obtain a current playback environment of audio;

perform audio recognition on ambient sound of the current playback environment;

determine foreground sound in the ambient sound according to an audio recognition result;

classify the foreground sound in the ambient sound to determine a type of the foreground sound; and perform audio mixing on the foreground sound and the audio to obtain mixed playback sound based on the type of the foreground sound, wherein to perform audio mixing on the foreground sound and the audio to obtain mixed playback sound based on the type of the foreground sound, the plurality of instructions, when executed by the processor, cause the processor to:

determine an audio mixing mode according to the type of the foreground sound, and perform audio mixing on the foreground sound and the audio by using the determined audio mixing mode to obtain the mixed playback sound.

11. The non-transitory computer-readable storage medium according to claim 10, wherein in order to perform audio recognition on ambient sound of the current playback environment, the plurality of instructions, when executed by the processor, cause the processor to:

sample the ambient sound of the current playback environment;

extract a Mel-frequency cepstrum coefficient feature of the ambient sound obtained by the sampling, to obtain a Mel feature of the ambient sound; and perform audio recognition on the Mel feature of the ambient sound by using an adaptive discriminant network.

12. The non-transitory computer-readable storage medium according to claim 11, wherein in order to determine the foreground sound in the ambient sound according to an audio recognition result, the plurality of instructions, when executed by the processor, cause the processor to:

classify the ambient sound according to the Mel feature of the ambient sound, to obtain the foreground sound and background sound in the ambient sound; and obtain the foreground sound in the ambient sound from the foreground sound and the background sound in the ambient sound.

13. The non-transitory computer-readable storage medium according to claim 11, wherein in order to classify the foreground sound in the ambient sound to determine a type of the foreground sound, the plurality of instructions, when executed by the processor, cause the processor to:

obtain types of the audio;

classify the foreground sound based on the types, to obtain a confidence level of the foreground sound in each type; and determine a type with a highest confidence level as the type of the foreground sound.

14. An electronic device comprising:

a memory storing a computer program;

a processor configured to execute the computer program, and upon execution of the computer program, is configured to:

obtain a current playback environment of audio;

perform audio recognition on ambient sound of the current playback environment;

determine foreground sound in the ambient sound according to an audio recognition result;

classify the foreground sound in the ambient sound to determine a type of the foreground sound; and perform audio mixing on the foreground sound and the audio to obtain mixed playback sound based on the type of the foreground sound, wherein to perform audio recognition on ambient sound of the current playback environment, the processor, upon execution of the computer program is configured to:

sample the ambient sound of the current playback environment;

extract a Mel-frequency cepstrum coefficient feature of the ambient sound obtained by the sampling, to obtain a Mel feature of the ambient sound; and perform audio recognition on the Mel feature of the ambient sound by using an adaptive discriminant network.

15. The electronic device according to claim 14, wherein the processor, upon execution of the computer program, is further configured to:

before performance of audio recognition on the Mel feature of the ambient sound by using an adaptive discriminant network:

obtain an ambient sound sample of a target playback environment; and perform adaptive training on a discriminant network by using the ambient sound sample, to obtain the adaptive discriminant network.

16. The electronic device according to claim 15, wherein in order to perform adaptive training on a discriminant network by using the ambient sound sample to obtain the adaptive discriminant network, the processor, upon execution of the computer program, is configured to:

extract a Mel-frequency cepstrum coefficient feature of the ambient sound sample, to obtain a Mel feature of the ambient sound sample;

classify the ambient sound sample according to the Mel feature of the ambient sound sample, to obtain a classification result of the ambient sound sample; and perform adaptive training on the discriminant network by using the Mel feature of the ambient sound sample and the classification result of the ambient sound sample, to obtain the adaptive discriminant network.

17. The electronic device according to claim 15, wherein the target playback environment comprises a plurality of playback scenarios, and the discriminant network comprises a plurality of preset Gaussian mixture models; and in order to perform adaptive training on a discriminant network by using the ambient sound sample, to obtain the adaptive discriminant network, the processor, upon execution of the computer program, is configured to:

train the plurality of preset Gaussian mixture models by using ambient sound samples of the plurality of playback scenarios, to obtain a plurality of Gaussian mixture models;

calculate a similarity between two of the plurality of Gaussian mixture models; and determine, in a case that the similarity exceeds a preset threshold, either of two Gaussian mixture models whose similarity exceeds the preset threshold as a Gaussian mixture model of the adaptive discriminant network.

* * * * *